June 13, 1961 F. R. J. FOWLER 2,987,887
HYDRAULIC COUPLING WITH FLUID CONTENT CONTROL
Filed Aug. 14, 1958 2 Sheets-Sheet 1

INVENTOR.
F. Robert J. Fowler
BY
Hugh L. Fisher
ATTORNEY

June 13, 1961 F. R. J. FOWLER 2,987,887
HYDRAULIC COUPLING WITH FLUID CONTENT CONTROL
Filed Aug. 14, 1958 2 Sheets-Sheet 2

INVENTOR.
F. Robert J. Fowler
BY
Hugh L. Fisher
ATTORNEY

United States Patent Office 2,987,887
Patented June 13, 1961

2,987,887
HYDRAULIC COUPLING WITH FLUID CONTENT CONTROL
F. Robert J. Fowler, Flint, Mich., assignor to General Motors Corporation, Detroit, Mich., a corporation of Delaware
Filed Aug. 14, 1958, Ser. No. 755,080
8 Claims. (Cl. 60—54)

This invention relates to drive systems, and particularly to drive systems adapted to vary speeds automatically in accordance with changes in some selected operating conditions.

Hydrodynamic torque transmitting devices, e.g., fluid couplings, are frequently employed in certain installations to vary automatically speeds in preference to multiple gearing pulleys, or the complex mechanisms sometimes employed to obtain infinitely variable drives. Simply by varying the quantity of fluid in the fluid coupling working circuit, the capacity of the coupling and, accordingly, the speed ratio through the coupling may be altered. For instance, when the coupling is completely filled, the torque capacity is maximum, and hence, the elements of the coupling will revolve as substantially the same speed, a slight differential being due to the inherent slippage. As the coupling is emptied the torque capacity progressively decreases as does the speed of the driven element until the coupling is emptied, and then, torque transfer to the driven element will be halted. Thus, as can be seen, by emptying and filling the coupling, an infinte number of speed ratios can be obtained. However, if relatively accurate speed regulation is desired with instantaneous response to changing conditions, the fluid in the working circuit must be removed or added quickly or else intervals of faulty regulation will occur as conditions change.

With this in mind, the invention contemplates a drive system that employs novel control means for instantly and accurately controlling the quality of fluid in the working circuit of a hydrodynamic torque transmitting device so as to alter speed ratios with changes in predetermined conditions.

Specifically, the invention affords in a drive system of the foregoing character a valve member which is provided with supply and discharge sections for controlling flow, respectively, to and from the hydrodynamic torque transmitting device working circuit.

More specifically, the invention has for an objective, the provision for movement of the preceding valve member discharge control section into and out of the hydrodynamic torque transmitting device working circuit as the valve member is moved between open and closed positions so that when in the circuit, fluid flow is interrupted and directed therefrom.

In carrying out the invention according to a preferred form, a hydrodynamic torque transmitting device, e.g., a fluid coupling, comprising impeller and turbine elements, is utilized. A fluid-tight enclosure is combined with the fluid coupling to provide a reservoir for fluid and revolves with one of the coupling elements. Fluid flow from the reservoir to the coupling working circuit is controlled by a valve member which has a supply section controlling communication between the reservoir and the working circuit through an inlet passage in the impeller element and a discharge section for controlling flow between the working circuit and the reservoir through an outlet passage, also in the impeller element. Movement of the valve member, between an open position in which the working circuit is supplied fluid and a closed position in which the working circuit is drained, is controlled by a sensitive device which reflects a cetrain operating condition, such as temperature.

To add to the effectiveness of the valve member the discharge section is shaped so as to, in the closed position of the valve member, scoop fluid from the working circuit. When in the circuit the resultant interruption of flow, also instantaneously reduces the coupling capacity. In between the fully open and closed positions of the valve member, the amounts of fluid supplied to the working circuit by the supply section and the amount removed by the discharge section, are correlated so as to provide an infinite number of speed ratios with immediate response to changing conditions.

The foregoing and other objects and advantages of the invention will be apparent from the following description and from the accompanying drawings, in which.

Figure 1:
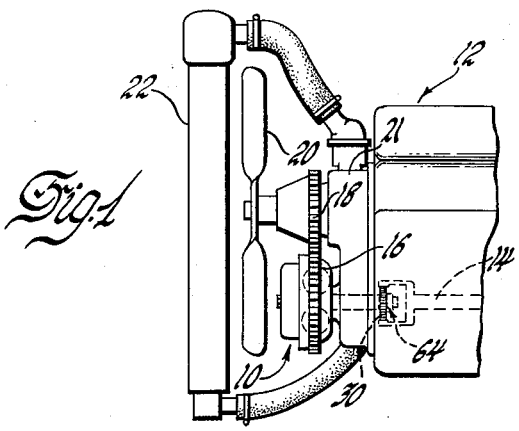
FIGURE 1 illustrates a drive system constructed according to the invention arranged to drive an engine cooling fan.

Referring to FIGURE 1 of the drawings, the installation shown thereby to demonstrate the invention includes a hydrodynamic torque transmitting device, such as the fluid coupling denoted generally at 10, that is combined with a vehicle engine 12 and arranged to transfer drive from a crankshaft 14 for the engine through intermeshing driving and driven gears 16 and 18 to a fan 20. The fan 20 is of known construction arranged to circulate air through the vehicle radiator 22 in the customary manner for reducing the temperature of the engine coolant. If desired, the fluid coupling 10 may be mounted concentric with the fan 20 and a coolant pump, designated fan 20 instead of through gears 16 and 18.

Figure 2:
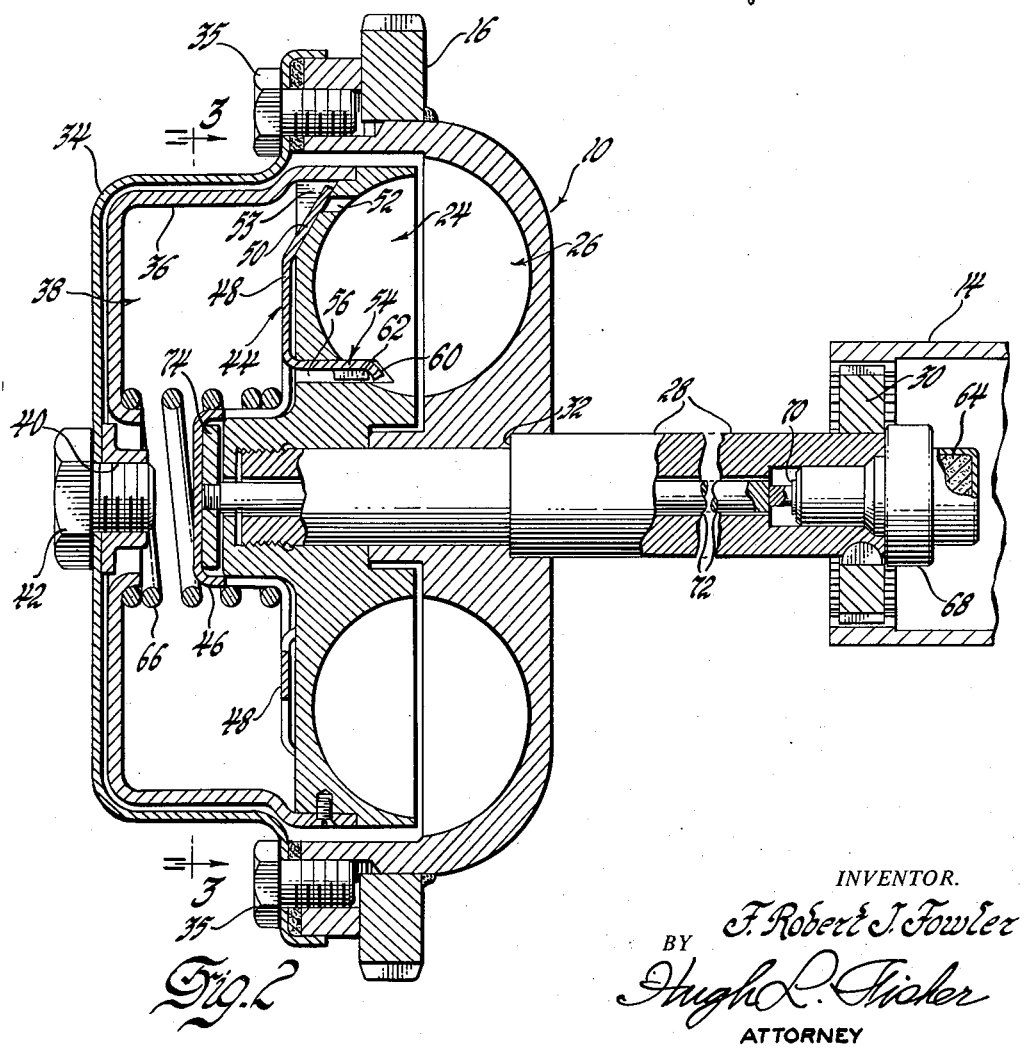
FIGURE 2 is a sectional view of a hydrodynamic torque transmitting device incorporated in the drive system.

As best shown in FIGURE 2, the fluid coupling 10 generally at 21, so as to transver drive directly to the comprises impeller and turbine elements 24 and 26, each afforded with the usual vanes for transferring fluid around a working circuit defined by the inside contours of the elements. A hollow driving shaft 28 has one end thereof threadedly engaged to the hub of the impeller element 24 and the other end joined to a gear 30, or the like, which, in turn, may be in the FIGURE 1 installation connected to an end of the engine crankshaft 14. The turbine element 26 has the driving gear 16 suitably attached to the outer periphery thereof and is revolvably supported by the shaft 28. The relative axial positions of the impeller and turbine elements 24 and 26 is established by a shoulder 32 on the hollow driving shaft 28.

To afford a fluid-tight enclosure for the coupling 10, a cup-like member 34 is affixed, as by bolts 35, to the turbine element 26. Inside this cup-like member 34, a shroud 36 of the same general configuration is situated and is attached to the outer peripheral edge of the impeller element 24. Shroud 36, along with impeller element 24, defines a fluid reservoir, indicated generally at 38 which is supplied through an opening 40 in the center of the cup-like member 34. The opening 40 is closed by a removable filler plug 42.

Figure 3:
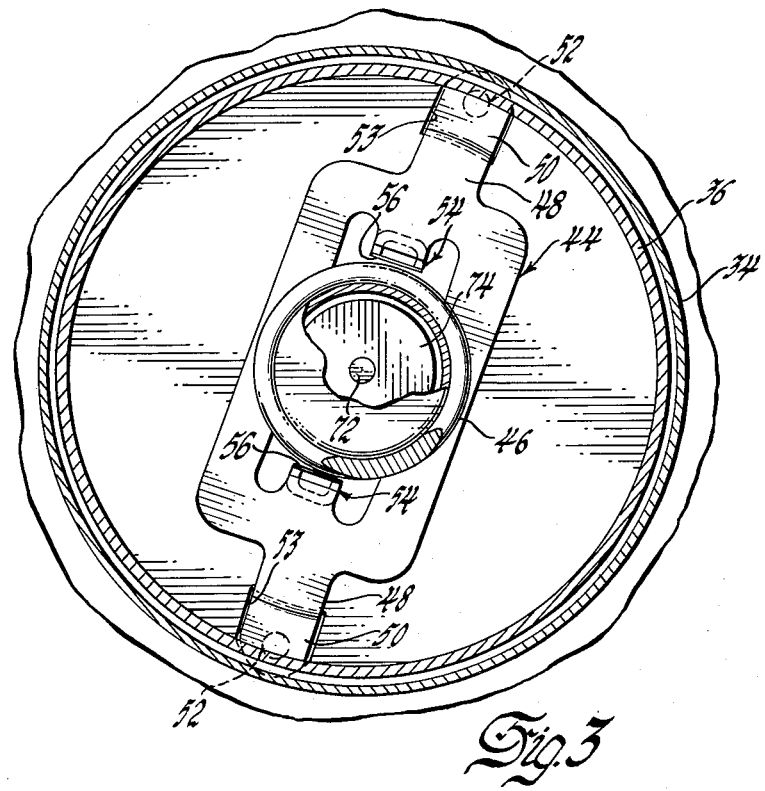
FIGURE 3 is a fragmentary sectional view, taken along line 3—3 of FIGURE 2, depicting the valve member employed to control the quantity of fluid in the hydrodynamic torque transmitting device working circuit.
Figure 4:
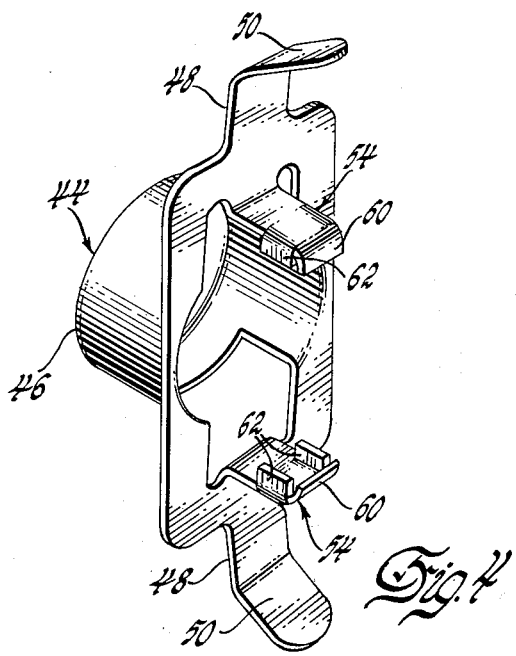
FIGURE 4 is a perspective view of the valve member.

Communication between the reservoir 38 and the fluid coupling working circuit is controlled by a valve member, designated generally at 44, and best shown by FIGURES 2, 3, and 4. The valve member 44 is provided with a guide hub 46 slidably disposed on the end of the impeller element 24 and has, preferably, for balancing purposes, two valve fingers 48 extending therefrom. Both of the valve member fingers 48 are shaped to conform to the outer contour of the impeller element 24, and at the outer end thereof, are afforded supply control sections 50, which in the closed position of the valve member 44, viewed in FIGURE 2, overlap and close two oppositely positioned inlet passages 52 opening into grooves 53 into which the supply sections 50 seat. In this closed position, communication between the coupling working circuit and the reservoir 38 through inlet passages 52 is consequently interrupted. Radially inwardly from the supply sections 50 and offset slightly with respect to the fingers 48, are laterally extending discharge control sections 54 which may be lanced from the valve member hub 46 so as to be integral therewith. These discharge sections 54 are rectangularly shaped as seen in FIGURES 3 and 4 and are slidable in similarly shaped outlet passages 56 provided therefor in the impeller element 24. This disposition of the discharge sections 54 causes the valve member 44 always to revolve with the impeller element 24 and furnishes additional guides for axial movement of the valve member. Also, as depicted in FIGURE 2, each of the discharge sections 54, at the terminal end thereof, is provided with a fluid deflecting tip 60 which, in the demonstrated closed position of the valve member 34, project into the working circuit so as to interfere with or partially interrupt flow and afford a scoop that directs fluid therefrom and through the outlet passage 56 to the reservoir 38. When the valve member 44 is withdrawn and moved to the open position, the deflecting tip 60 blends with the inner diameter of the impeller element 24 and together with oppositely spaced side walls 62 thereon closes the outlet passage 56. Therefore, in the fully open position of the valve member 44, the discharge sections 54 close the outlet passages 56, thereby interrupting out-flow from the working circuit to the reservoir 38, while the supply section 50 completely opens inlet passages 52 and admits fluid from the reservoir 38 to the working circuit.

Movement of the valve member 44 may be through a suitable agency that reflects predetermined conditions, such as the temperature. For this purpose a thermosensitive device 64 is arranged (see FIGURE 2) to urge, upon an increase in temperature, the valve member 44 towards the open position against the opposing bias from a spring 66, interposed between the valve member 44 and the shroud 36. The thermosensitive device 64 is composed of a capsule 68 containing temperature-sensitive material, e.g., wax or the like, and a plunger 70 which is forced outwardly by the thermosensitive material as temperature increases. The capsule 68 is located in the end of the hollow driving shaft 28 and is, preferably, either exposed to the coolant for the engine 12 or to the surrounding air. The plunger 70 engages one end of a control rod 72 likewise situated in the hollow driving shaft, while the opposite end of the control rod 72 has a flange 74 thereon engageable with the guide hub 46 of the valve member 44.

To summarize the operation of the drive system, the two extreme conditions will be first described. For maximum capacity, as when maximum cooling is required, the thermosensitive device 64 will force the valve member 44 to the fully open position. Then, as has been described, the valve member supply sections 50 will open the passages 52 and the discharge sections 54 will completely close the outlet passages 56. With the driving shaft 28 revolving and carrying therewith both the impeller element 24 and the shroud 36, the fluid in the reservoir 38 will move outwardly due to centrifugal force and form an annular ring along the inside of the shroud 36. With the inlet passage 52 opened, this fluid will be forced by the centrifugal effect into the coupling 10 whereupon the fluid will flow, because of the vane construction, between the impeller and turbine elements 24 and 26 in a clockwise direction, thus defining the working circuit. When the coupling 10 is completely filled, the driving gear 16 will be driven at approximately, except for inherent fluid slippage, the same speed as the driving shaft 28 and the cooling fan 20 will offer maximum cooling. With the other extreme, and the plunger 70 of thermosensitive device 64 withdrawn, due to a predetermined temperature decrease, so that the valve member 44 is forced to the FIGURE 2 closed position by spring 66, the supply sections 50 will overlap and will close inlet passages 52, while the discharge sections 54 will have moved to their maximum extent into the working circuit. Once the valve member 44 is in the closed position, centrifugal force acting on the fluid in the reservoir 38, will assist the spring 66 in holding the valve member 44 closed. If fluid is present in this circuit, the scoop action from the deflecting tips 60 will quickly remove the fluid therefrom and discharge it via outlet passage 56 to the reservoir 38. Significant is the fact that because the discharge sections 54 do project partially into the working circuit the torque capacity of the coupling 10 is also instantaneously decreased by the resultant reduced flow. Since the reduction in the coupling torque capacity is proportional to the extent the discharge sections 54 project into the circuit, the amount may be varied to meet the requirements of different applications.

In between these described extreme open and closed positions, the valve member 44 will be shifted by the thermosensitive device 64, dependent on the temperature, so as to drive the fan 20 at a speed that will maintain the engine coolant at some selected temperature. Hence, the valve member 44 will shift axially amounts adequate to correlate the opening and closing of the inlet and outlet passages 52 and 56 so that the quantity of fluid in the working circuit is that needed to drive the fan 20 at the corresponding speed.

From the foregoing, it can be seen that by having the described valve member 44 so arranged with respect to the fluid coupling 10 very effective speed regulation is possible. Centrifugal force not only assists the spring 66 in holding the valve member 44 closed, but also aids in forcing fluid quickly into the working circuit of the coupling 10 when the valve member 44 is opened. In addition, the deflecting tip 60 on each valve member discharge section 54 not only quickly scoops fluid from the working circuit and discharges it into the reservoir 38 through outlet passages 56, but, because of the fact that it does project into the working circuit affords a way of quickly reducing the torque capacity of the coupling 10 while the quantity of fluid in the circuit is subsequently reduced.

The invention is to be limited only by the following claims.

I claim:

1. In a drive system, the combination of a hydrodynamic torque transmitting device comprising driving and driven members together defining a fluid working circuit, and means for controlling the quantity of fluid in the working circuit so as to vary the torque capacity of the device and afford a variable speed drive therethrough, the control means including a valve member movable between open and closed positions, the valve member being arranged in the open position to transfer fluid to the working circuit, the valve member including a fluid deflecting portion arranged in the closed position of the valve member to restrict flow in the working circuit and also to direct fluid therefrom, and means for moving the valve member between the open and closed positions so as to vary the drive through the device.

2. In a drive system, the combination of a hydrodynamic torque transmitting device comprising driving and driven members together defining a fluid working circuit, and means for controlling the quantity of fluid in the working circuit so as to vary the maximum torque capacity of the device within predetermined limits and accordingly the slippage between the members, thereby affording a variable speed drive therethrough, the control means including a valve member movable between open and closed positions in which fluid is respectively supplied to and discharged from the working circuit, the valve member being provided with a control section movable into the working circuit when the valve member is moved towards the closed position so as to both restrict fluid flow in the working circuit and to direct fluid therefrom, thereby reducing the capacity of the device, and means for moving the valve member between the open and closed positions in response to predetermined conditions so as to vary the drive through the device.

3. In a drive system, the combination of a hydrodynamic torque transmitting device comprising driving and driven elements together defining a fluid working circuit, one of the elements having inlet and outlet passages, and means for controlling the quantity of fluid in the working circuit so as to vary the torque capacity of the device and afford a variable speed drive therethrough, the control means including a valve member revolvable with said one element and movable between open and closed positions, the valve member including a fluid deflecting portion and being arranged in the open position to open the inlet passage and close the outlet passage and in the closed position to close the inlet passage and have the fluid deflecting portion positioned so as to both restrict fluid flow in the working circuit and to direct fluid from the working circuit through the outlet passage, and means for moving the valve member between the open and closed positions in response to predetermined conditions so as to vary the drive through the device.

4. In a drive system, the combination of a hydrodynamic torque transmitting device comprising driving and driven elements together defining a fluid working circuit, one of the elements having inlet and outlet passages, and means for controlling the quantity of fluid in the working circuit so as to vary the maximum torque capacity of the device within predetermined limits and accordingly the slippage between the elements thereby affording a variable speed drive therethrough, the control means including a valve member revolvable with said one element and movable between open and closed positions, the valve member having supply and discharge control sections, the supply control section being arranged to open and close the inlet passage, respectively, in the open and closed positions of the valve member, the discharge control section being arranged when the valve member is moved to the closed position to move into the working circuit so as to restrict fluid flow in the working circuit and also to direct fluid therefrom and through the outlet passage and when the valve member is moved to the open position to be withdrawn from the working circuit and close the outlet passage, and means for moving the valve member between the open and closed positions in response to predetermined conditions so as to vary the drive through the device.

5. In a drive system, the combination of a hydrodynamic torque transmitting device comprising driving and driven elements together defining a fluid working circuit, one of the elements having inlet and outlet passages, a fluid reservoir for the device communicating with the inlet and outlet passages, and means for controlling the quantity of fluid in the working circuit so as to vary the maximum torque capacity of the device within predetermined limits and accordingly the slippage between the elements thereby affording a variable speed drive therethrough, the control means including a valve member revolvable with said one element and movable between open and closed positions, the valve member having supply and discharge control sections, the supply control section being arranged to open and close the inlet passage to the reservoir, respectively, in the open and closed positions of the valve member, the discharge control section being provided with a fluid deflecting portion and so arranged when the valve member is moved to the closed position that the fluid deflecting portion is moved into the working circuit to both restrict flow in the working circuit and direct fluid therefrom through the outlet passage to the reservoir and when the valve member is moved to the open position that the fluid deflecting portion is withdrawn from the working circuit and the outlet passage is closed, biasing means for urging the valve member to the closed position, and means for moving the valve member between the open and closed positions in response to predetermined conditions so as to vary the drive through the device.

6. In a drive system, the combination of a fluid coupling comprising impeller and turbine elements together defining a fluid working circuit, one of the elements having inlet and outlet passages, and means for controlling the quantity of fluid in the working circuit so as to vary the maximum torque capacity of the fluid coupling within predetermined limits and accordingly the slippage between the elements thereby affording a variable speed drive therethrough, the control means including a valve member revolvable with said one element and movable between open and closed positions, the valve member including a fluid deflecting portion and being arranged so that when the valve member is moved to the closed position the inlet passage is closed and the fluid deflecting portion is moved into the working circuit to restrict fluid flow in the circuit and also to direct fluid therefrom through the outlet passage and when the valve member is moved to the open position the inlet passage is opened and the fluid deflecting portion is removed from the working circuit closing the outlet passage, and means for moving the valve member between the open and closed positions in response to predetermined conditions so as to vary the drive through the coupling.

7. In a drive system, the combination of a fluid coupling comprising impeller and turbine elements together defining a fluid working circuit, a fluid reservoir revolvable with the coupling, the impeller element being provided with an inlet passage in the outer periphery thereof and an outlet passage spaced radially inwardly from the inlet passage, both passages extending between the reservoir and the working circuit, and means for controlling the quantity of fluid in the working circuit so as to vary the torque capacity of the coupling and afford a variable speed drive therethrough, the control means including a valve member revolvable with the impeller element and movable between open and closed positions relative to the inlet passage, the valve member having supply and discharge control sections, the supply control section being arranged to open and close the inlet passage, respectively, in the open and closed positions of the valve member, the discharge control section being slidably disposed in the outlet passage and arranged when the valve member is moved to the closed position to move into the working circuit so as to interrupt flow and direct fluid therefrom through the outlet passage to the reservoir and when the valve member is moved to the open position to be withdrawn from the working circuit and close the exhaust passage, means for moving the valve member to the open position in response to predetermined conditions, and biasing means for urging the valve member to the closed position.

8. In a drive system, the combination of a fluid coupling comprising impeller and turbine elements together defining a fluid working circuit, an enclosure for the coupling revolvable with the turbine element, a shroud revolvable with the impeller to form a fluid reservoir, the impeller element being provided with an inlet passage in the outer periphery thereof and an outlet passage spaced radially inwardly from the inlet passage, both passages extending between the reservoir and the working circuit, and means for controlling the quantity of fluid in the working circuit so as to vary the torque capacity of the coupling and afford a variable speed drive therethrough, the control means including a valve member axially movable between open and closed positions relative to the inlet passage, the valve member having a supply control section arranged to overlap the inlet passage in the closed position of the valve member and interrupt flow through the inlet passage and a discharge control section slidably disposed in the outlet passage so as to cause the valve member to revolve with the impeller element, the discharge control section being provided with a fluid deflecting portion and so arranged when the valve member is moved to the closed position that the fluid deflecting portion is moved into the working circuit to interrupt flow and direct fluid therefrom through the outlet passage to the reservoir and when the valve member is moved to the open position that the fluid deflecting portion is withdrawn from the working circuit and closes the outlet passage, biasing means for urging the valve member to the closed position and means for moving the valve member to the open position in response to temperature.

References Cited in the file of this patent
UNITED STATES PATENTS

| | | |
|---|---|---|
| 1,859,607 | Sinclair | May 24, 1932 |
| 1,866,424 | Schmieske | July 5, 1932 |
| 2,024,842 | Bauer et al. | Dec. 17, 1935 |
| 2,127,738 | Kugel | Aug. 23, 1938 |
| 2,245,684 | Kiep | June 17, 1941 |
| 2,768,501 | Muller | Oct. 30, 1956 |

UNITED STATES PATENT OFFICE
CERTIFICATE OF CORRECTION

Patent No. 2,987,887                          June 13, 1961

F. Robert J. Fowler

It is hereby certified that error appears in the above numbered patent requiring correction and that the said Letters Patent should read as corrected below.

Column 1, line 24, for "as" read -- at --; line 31, for "infiinte" read -- infinite --; column 2, line 43 strike out "generally at 21, so as to transver drive directly to the"; line 40, after "designated" insert -- generally at 21, so as to transfer drive directly to the --.

Signed and sealed this 7th day of November 1961.

(SEAL)
Attest:

ERNEST W. SWIDER                          DAVID L. LADD
Attesting Officer                           Commissioner of Patents

USCOMM-DC